United States Patent Office 3,496,250
Patented Feb. 17, 1970

3,496,250
BLENDS OF EPOXY RESINS AND ACRYLONITRILE BUTADIENE-STYRENE GRAFT COPOLYMERS
Richard W. Czerwinski, Washington, W. Va., assignor to Borg-Warner Corporation, Chicago, Ill., a corporation of Illinois
No Drawing. Filed Feb. 21, 1967, Ser. No. 617,497
Int. Cl. C08g 45/04; C08f 41/10
U.S. Cl. 260—836         7 Claims

ABSTRACT OF THE DISCLOSURE

An epoxy resin-ABS graft polymer blend composition. The blend is comprised of a range of between from 4-96 parts by weight of epoxy resin with correspondingly 96-4 parts by weight ABS graft polymer. The blend is useful for adhesives, coatings, films, fibers and the like.

Background

Prior to this invention, epoxy resins were utilized in a great variety of adhesive and coating applications which required high temperature resistance combined with good adhesive strength. It was well known, however, that the epoxy resins were relatively brittle materials when cured and exhibited comparatively poor impact strength and flexibility when used in films and coatings. These qualities made epoxy resin difficult, and in many cases, impossible, to use in applications which required flexibility.

It has been found that new and useful compositions may be prepared by blending epoxy resins with ABS graft polymers. These blends have been found useful for a variety of applications such as films, fibers, adhesives, coatings, and the like. The compositions have also been found to be extraordinarily effective adhesives and coatings for metals, wood, plastics, including plated plastics, leather and the like.

Summary of invention

Generally stated, this invention is directed to compositions prepared by blending from about 4 parts by weight of epoxy resin to about 96 parts by weight epoxy resin with correspondingly from about 96 parts by weight graft polymer to about 4 parts by weight graft polymer.

The compositions prepared in accordance with this invention combine chemical resistance and good adhesion (when used as adhesives) with extraordinary flexibility, shear strength, and impact characteristics. The compositions of this invention may be cured in situ either with or without heat in the presence of a curing agent.

It will be noted that the greater the epoxy resin content in the blend, the harder and more brittle will be the compositions. Also, as the epoxy content is increased in the blends, chemical resistance and high temperature strength will increase. As the amount of the graft polymer is increased in the compositions, the flexibility and impact strengths of the compositions will increase. Thus, by merely varying the relative ratios of the two components in the blends, extraordinary adhesives and coating compositions may be prepared as well as flexible films and fibers.

The specific epoxy resins utilized in this invention are normally prepared by reacting an epoxide containing compound such as epichlorohydrin with a polyhydric compound such as glycerine or a bisphenol in the presence of sufficient basic material to bind the hydrochloric acid to form epoxy terminated prepolymers. Epoxies may also be prepared by epoxidation of polyolefins with a peroxidizing agent such as peracetic acid. The resins formed vary according to the molar proportions and reaction conditions and have melting points ranging from about 0° C. to about 140° C. and a molecular weight between about 300 and 4000. There are a great variety of epoxy resins which are available commercially in a wide range of epoxy content, molecular weight, softening point and compositions. For example, it has been found that aliphatic epoxy resins such as Epon 812, a triglycidyl ether of glycerol having an epoxy equivalent of 140–160 and a viscosity in centipoises at 25° C. of 100–170, aromatic epoxies such as DEN 438 a polyglycidyl ether of phenol-formaldehyde novolac having an epoxy equivalent weight of 176–181 and a viscosity at 52° C. of 35,000–70,000 centipoises, or Epon 828 may be used as well as modified epoxy resins such as Epon 815, Epon 828 diluted with 11% butyl glycidyl ether having an epoxy equivalent weight 175 to 195 and a viscosity of 500–700 centipoises at 25° C. The modified epoxies utilized may be blended with either a second epoxy, a plasticizer or the like. The specific epoxy resins utilized in the adhesive examples set forth in this invention were Epon 828, a bisphenol-A—epichlorohydrin liquid resin having a molecular weight of about 380, and Unox 221, an epoxy prepared by epoxidation of a polyolefin with peracetic acid.

The graft polymers utilized in this invention are commonly known as ABS graft polymers. A graft polymer is a polymer prepared by first polymerizing a monomer (or mixture of monomers) with subsequent polymerization of a second monomer or group of monomers onto the product of the first polymerization. The first polymerization prepares what is hereinafter referred to as the rubbery backbone.

The specific graft polymers utilized in this invention are prepared by first polymerizing a conjugated diene, such as butadiene, or a conjugated diene in the presence of a monovinyl aromatic hydrocarbon such as styrene, to provide a polymerized diene rubbery backbone such as polybutadiene or a butadiene-styrene copolymer backbone. Thereafter, a second monomer or group of monomers are grafted onto the rubbery backbone to complete the graft polymer. This is accomplished by the addition and interaction under polymerization conditions of an acrylonitrile, substituted acrylonitrile, or an acrylic acid ester and a monovinyl aromatic hydrocarbon exemplified respectively by acrylonitrile or methyl methacrylate and styrene.

The backbone, i.e., conjugated diene polymer or copolymer, is prepared so as to comprise from about 60 percent to about 10 percent by weight of the total composition and the acrylonitrile, substituted acrylonitrile or acrylic acid ester and the monovinyl aromatic hydrocarbon that is polymerized in the presence of the backbone polymer or copolymer comprises from about 40 percent to about 90 percent by weight of the total composition.

The acrylonitrile, substituted acrylonitrile, or acrylic acid ester preferably comprises from about 5 percent to about 45 percent by weight of the three-component organic mixture and the monovinyl aromatic hydrocarbon comprises from about 30 percent to about 80 percent of the total composition. The term monovinyl aromatic hydrocarbon is meant to include compounds such as styrene, α-methylstyrene, vinyltoluene, vinylxylene, ethylvinylbenzene, isopropylstyrene, chlorostyrene, dichlorostyrene, ethylchlorostyrene, mixtures thereof and the like. The term acrylonitrile, substituted acrylonitrile and acrylic acid ester compounds is meant to include compounds such as acrylonitrile, methacrylonitrile, ethacrylonitrile, chloroacrylonitrile, methyl methacrylate, ethyl methacrylate, propyl methylacrylate, etc., mixtures thereof and the like.

In compounding the compositions of this invention, the ABS graft polymer is either dissolved in a solvent or mixed with the epoxy resin, without solvent, such as on a rubber mill. The two primary components are normally placed in solution by adding them to a solvent. Prior to utilization of the composition as a film, fiber, adhesive, coating, etc., a curing agent is added. It should be understood that a solvent lowers the solids content and if 100 percent solids are desired, the solvent may be eliminated. Solvents that may be used, if a solvent is desired, are those in which both the epoxy resin and ABS graft polymer are soluble. Solvents such as methyl ethyl ketone, cyclohexanone, acetone, methyl isobutyl ketone, toluene and xylene have been found useful. Solvents are used primarily to facilitate handling and when utilized, are allowed to evaporate prior to bonding.

In the curing of the compositions, a reactive crosslinking agent is utilized to crosslink the compositions, and heat is applied as set forth in the tables. Crosslinking agents such as polyamines, e.g., triethylenetetramine, boron trifluorideamine complex, dibasic acid anhydride, substituted imidazoles, phenolics, and substituted phenol catalysts, and urea resins have been found to be suitable. The curing agent may be present in amounts from about one percent by weight to about ninety percent by weight of the total composition depending upon the specific curing agent and epoxy resin being utilized. Lewis acid curing agents, such as stannous chloride and boron trifluoride require relatively low amounts, i.e., from about one to about five percent, whereas the amine complexes may require from four to fifteen percent and the carboxylated materials, e.g., carboxy terminated butadiene and methacrylic acid, as well as polyamides, such as those prepared by condensation of polymerized unsaturated acid with diof polybutadiene. The graft polymer of the examples designated as Graft Copolymer B was prepared from about 29 parts by weight of acrylonitrile and 58 parts by weight of styrene polymerized in the presence of about 13 parts by weight of polybutadiene. The graft polymer designated as C was prepared from 39 parts by weight of methyl methacrylate and 38 parts by weight of styrene polymerized in the presence of a 10–90 rubbery copolymer of styrene-butadiene. As mentioned, other monomers may be substituted to prepare the graft polymers, e.g., other monovinyl aromatic hydrocarbons may be substituted for styrene and other acrylic acid nitriles for the acrylonitrile and a styrene-butadiene substrate may be substituted for the polybutadiene.

The compositions utilized in the examples were compounded by mixing the graft polymer and the designated epoxy resin in a methyl ethyl ketone solvent in the presence of 10 parts by weight curing agent. The epoxy resins that are illustrated in the examples are Epon 828 (epoxy) a low molecular weight epoxy resin sold by Shell Chemical and Unox 221, an epoxy resin prepared by peroxidation of polyolefin by peracidic acid sold by Union Carbide, however, other Shell epoxy resins such as Epon 1009, 1001, 1004, 1045–A–80, 1031, a tetrafunctional solid polyglycidyl ether of tetraphenylene ethane having an epoxy equivalent weight of 210–240, 812 and 1002, as well as Ciba epoxy resins such as 6005, ECN 1235, EPN 1139, ECN 1299, 6010 and the like may also be used. The preferred molecular weight epoxy resins are those having a molecular weight between about 300 to 4000.

COMPOSITION OF EPOXY RESIN

| Name | Epoxy Equivalent Wt. | Molecular Wt. | Viscosity (centipoises) | Chemical Composition |
|---|---|---|---|---|
| Epon 828 | 185–192 | Double epoxy equivalent | 10,000–16,000 at 25° C | Liquid DGEBA.* |
| Epon 1009 | 2,500–4,000 | do | 145–155 at 25° C | Solid DGEBA. |
| Epon 1001 | 450–550 | do | 65–75 at 25° C | Do. |
| Epon 1004 | 875–1,025 | do | 95–105 at 25° C | Do. |
| Epon 1002 | 600–700 | do | 75–85 at 25° C | Do. |
| Ciba 6005 | 182–189 | do | 7000–10,000 at 25° C | Liquid DGEBA. |
| ECN 1235 | 215 | Several times epoxy equivalent wt. | 35 at 25° C | Polyglycidyl ether of orthocresol-formaldehyde novolac resin. |
| EPN 1139 | 172–179 | do | 1700 at 52° C | Polyglycidyl ether phenol-formaldehyde novolac resin. |
| ECN 1299 | 235 | do | 99 at 25° C | Polyglycidyl ether of orthocresol-formaldehyde novolac resin. |
| 6010 | 185–196 | Double epoxy equivalent | 12,000–16,000 at 25° C | Liquid DGEBA. |
| Unox 221 | 252.31 | Sp. gravity, 1.750; B.P., 354° C.; Flash point, 400° C. | | Dicyclodiepoxy carboxylate. |

*DGEBA—diglycidyl ether of bisphenol A resin.

amines, require as much as fifty to ninety percent by weight. The higher concentrations of curing agent appear to enhance the flexibility and temperature resistance of the resulting compositions.

The compositions of this invention may utilize fillers and pigments, such as titanium dioxide, zinc oxide, silica, alumina, nickel oxide, lead oxide and the like, and in many cases, the fillers and pigments impart strength as well as color to the compositions.

As mentioned, the compositions of this invention are useful as films and fibers and are especially useful as coatings and as adhesives. The examples set forth the strength properties of specific compositions that are utilized in adhering various materials to each other. The examples also show the strength of the compositions as coatings. The compositions of this invention may also be used in adhering flock to ABS surfaces, wood surfaces, fabric, concrete, ceramics, steel, etc., and are especially useful in adhering materials to chrome-plated ABS surfaces. Most of the examples set forth the physical properties and curing temperatures and time of the compositions when utilized as adhesives, however, it will be understood that the curing period as well as the relative percentages of composition will not be greatly changed when the materials are used as coating compositions.

The specific graft polymer designated as Graft Copolymer A set forth in the tables consisted of about 30 parts by weight acrylonitrile and 50 parts by weight styrene polymerized in the presence of about 20 parts by weight The results of the preparation of various compositions are set forth in the tables which show the physical properties of the graft polymer-epoxy blends.

In preparing the adhesives set forth in the tables, various proportions of epoxy resin were utilized in conjunction with varying proportions of graft polymer. For purposes of illustration, the amount of epoxy resin varied from about 4 percent to about 96 percent of the total composition, and correspondingly, the graft polymer varied from about 96 percent to about 4 percent of the total composition.

In the testing of the adhesive compositions, ASTM Test D–1002–64 was utilized. Specifically, in the testing of adhesion of steel to steel, 4" x 7" steel strips were applied with an adhesive surface of ½" x 7" along one edge of the strip and the plates were applied to one another along that surface having adhesive applied thereto. Minimum clamping pressure was applied along the overlapped portion of the strips. The strips were placed in an oven for the indicated time and temperature shown in the table. After the oven cure, the strips were conditioned for twenty-four hours in a constant temperature, constant humidity room. The adhered strips were cut into 1" x 7½" strips and pulled at a loading rate of 600–700 p.s.i./min. The average pull for the five strips was recorded as the value for the test.

When the adhesive was applied as a film, the film solution was spread on a Teflon coated surface, dried at 100° F. in a vacuum oven. After the film was dried (about 3 mils thick), it was pulled from the Teflon surface and stored for use as an adhesive. The adhesive was thereafter utilized by placing the film between the surface to be bonded and applying pressure during the curing cycle.

In the examples, all parts are by weight unless otherwise indicated. In Table 1, the blends of this invention are used as adhesives for bonding various substrates such as wood, leather and steel.

TABLE 1

| Recipe | Parts by Weight | Adhesion of Wood to— | Shear, p.s.i. | Cure, ° F./time | Failure |
|---|---|---|---|---|---|
| Epon 828 (Epoxy) | 100 | Wood | 375 | 265° F./10 min | Wood. |
| Graft Copolymer A | 25 | | | | |
| Methyl ethyl ketone | 125 | | | | |
| Triethylenetetramine | 10 | | | | |
| Epon 828 (Epoxy) | 100 | ----do---- | 500 | 265° F./10 min | Do. |
| Graft Copolymer A | 50 | | | | |
| Methyl ethyl ketone | 150 | | | | |
| Triethylenetetramine | 10 | | | | |
| Epon 828 (Epoxy) | 100 | ----do---- | 450 | 265° F./10 min | Do. |
| Graft Copolymer A | 75 | | | | |
| Methyl ethyl ketone | 175 | | | | |
| Triethylenetetramine | 10 | | | | |
| Epon 828 (Epoxy) | 100 | ----do---- | 400 | 265° F./10 min | Wood and bond. |
| Graft Copolymer A | 100 | | | | |
| Methyl ethyl ketone | 200 | | | | |
| Triethylenetetramine | 10 | | | | |
| Epon 828 (Epoxy) | 100 | ----do---- | 350 | 265° F./10 min | Do. |
| Graft Copolymer A | 133 | | | | |
| Methyl ethyl ketone | 233 | | | | |
| Triethylenetetramine | 10 | | | | |
| Epon 828 (Epoxy) | 100 | ----do---- | 375 | 265° F./10 min | Wood. |
| Graft Copolymer A | 200 | | | | |
| Methyl ethyl ketone | 300 | | | | |
| Triethylenetetramine | 10 | | | | |
| Epon 828 (Epoxy) | 100 | ----do---- | 400 | 265° F./10 min | Do. |
| Graft Copolymer A | 400 | | | | |
| Methyl ethyl ketone | 500 | | | | |
| Triethylenetetramine | 10 | | | | |

| Recipe | Parts by Weight | Adhesion of Leather to— | Shear, p.s.i. | Cure, ° F./time | Failure |
|---|---|---|---|---|---|
| Epon 828 (Epoxy) | 100 | Leather | 75 | 265° F./10 min | Leather. |
| Graft Copolymer A | 25 | | | | |
| Methyl ethyl ketone | 125 | | | | |
| Triethylenetetramine | 10 | | | | |
| Epon 828 (Epoxy) | 100 | ----do---- | 75 | 265° F./10 min | Do. |
| Graft Copolymer A | 50 | | | | |
| Methyl ethyl ketone | 150 | | | | |
| Triethylenetetramine | 10 | | | | |
| Epon 828 (Epoxy) | 100 | ----do---- | 65 | 265° F./10 min | Do. |
| Graft Copolymer A | 75 | | | | |
| Methyl ethyl ketone | 175 | | | | |
| Triethylenetetramine | 10 | | | | |
| Epon 828 (Epoxy) | 100 | ----do---- | 65 | 265° F./10 min | Do. |
| Graft Copolymer A | 100 | | | | |
| Methyl ethyl ketone | 175 | | | | |
| Triethylenetetramine | 10 | | | | |
| Epon 828 (Epoxy) | 100 | ----do---- | 65 | 265° F./10 min | Do. |
| Graft Copolymer A | 133 | | | | |
| Methyl ethyl ketone | 233 | | | | |
| Triethylenetetramine | 10 | | | | |
| Epon 828 (Epoxy) | 100 | ----do---- | 55 | 265° F./10 min | Do. |
| Graft Copolymer A | 300 | | | | |
| Methyl ethyl ketone | 300 | | | | |
| Triethylenetetramine | 10 | | | | |
| Epon 828 (Epoxy) | 100 | ----do---- | 75 | 265° F./10 min | Leather and bond. |
| Graft Copolymer A | 400 | | | | |
| Methyl ethyl ketone | 500 | | | | |
| Triethylenetetramine | 10 | | | | |

| Recipe | Parts by Weight | Adhesion of GC [1] to— | Shear, p.s.i. | Cure, ° F./time | Failure |
|---|---|---|---|---|---|
| Epon 828 (Epoxy) | 100 | Steel | 600 | 190° F./30 min | GC. [1] |
| Graft Copolymer A | 400 | | | | |
| Methyl ethyl ketone | 500 | | | | |
| Triethylenetetramine | 10 | | | | |
| Epon 828 (Epoxy) | 100 | Galvanized Steel | 300 | 190° F./30 min | Bond. |
| Graft Copolymer A | 400 | | | | |
| Methyl ethyl ketone | 500 | | | | |
| Triethylenetetramine | 10 | | | | |
| Epon 828 (Epoxy) | 100 | Stainless Steel | 600 | 190° F./30 min | GC.[1] |
| Graft Copolymer A | 400 | | | | |
| Methyl ethyl ketone | 500 | | | | |
| Triethylenetetramine | 10 | | | | |
| Epon 828 (Epoxy) | 100 | Wood | 450 | 190° F./30 min | Wood. |
| Graft Copolymer A | 400 | | | | |
| Methyl ethyl ketone | 500 | | | | |
| Triethylenetetramine | 10 | | | | |
| Epon 828 (Epoxy) | 100 | Graft Copolymer | 450 | 190° F./30 min | GC.[1] |
| Graft Copolymer A | 400 | | | | |
| Methyl ethyl ketone | 500 | | | | |
| Triethylenetetramine | 10 | | | | |

[The above five examples were repeated using dimethylaminomethyl substituted phenol instead of triethylenetetramine with comparable test results]

| Recipe | Parts by Weight | Adhesion of GC [1] to— | Shear, p.s.i. | Cure, ° F./time | Failure |
|---|---|---|---|---|---|
| Epon 828 (Epoxy) | 100 | Stainless Steel | 800 | 70° F./24 hrs | GC.[1] |
| Graft Copolymer A | 25 | Copper | 800 | 70° F./24 hrs | GC.[1] |
| Methyl ethyl ketone | 135 | | | | |
| Dimethylaminomethyl-substituted phenols | 20 | | | | |

See footnotes at end of table.

TABLE 1.—Continued

[In the following examples, the bond was steel to steel]

| Recipe | Parts by Weight | Adhesion of Steel to— | Shear, p.s.i. | Cure, °F./time | Failure |
|---|---|---|---|---|---|
| Epon 828 (Epoxy) | 100 | Steel | 1,650 | 265° F./10 min | Bond. |
| Graft Copolymer A | 25 | | | | |
| Methyl ethyl ketone | 125 | | | | |
| Triethylenetetramine | 10 | | | | |
| Epon 828 (Epoxy) | 100 | ----do---- | 1,250 | 265° F./10 min | Do. |
| Graft Copolymer A | 50 | | | | |
| Methyl ethyl ketone | 150 | | | | |
| Triethylenetetramine | 10 | | | | |
| Epon 828 (Epoxy) | 100 | ----do---- | 1,200 | 265° F./10 min | Do. |
| Graft Copolymer A | 200 | | | | |
| Methyl ethyl ketone | 300 | | | | |
| Triethylenetetramine | 10 | | | | |
| Epon 828 (Epoxy) | 100 | ----do---- | 1,375 | 265° F./10 min | Do. |
| Graft Copolymer A | 400 | | | | |
| Methyl ethyl ketone | 500 | | | | |
| Triethylenetetramine | 10 | | | | |
| Epon 828 (Epoxy), 96% by wt | 100 | ----do---- | 1,430 | 72° F./70 hrs | Adhesive. |
| Graft Copolymer A, 4% by wt | 4 | | | | |
| Dimethylaminomethyl-substituted phenols | 10 | | | | |
| Methyl ethyl ketone | 20 | | | | |
| Graft Copolymer A, 96% by wt | 50 | ----do---- | 1,140 | 250° F./18 hrs | Do. |
| Epon 828 (Epoxy), 4% by wt | 2 | | | | |
| Triethylenetetramine | 0.2 | | | | |
| Methyl ethyl ketone | 20 | | | | |
| Graft Copolymer A, 92.5% by wt | 50 | ----do---- | 980 | 250° F./18 hrs | Do. |
| Epon 828 (Epoxy), 7.5% by wt | 4 | | | | |
| Triethylenetetramine | 0.4 | | | | |
| Methyl ethyl ketone | 20 | | | | |
| Graft Copolymer A | 100 | ----do---- | 40 | 250° F./18 hrs | Do. |
| Methyl ethyl ketone | 200 | | | | |

[1] Graft copolymer comprised of about 50 percent by weight styrene and 30 percent by weight acrylonitrile copolymerized in the presence of about 20 percent by weight polybutadiene.

In Tables 2 and 3 the blends of this invention are utilized as coatings on various substrates.

TABLE 2

| Recipe | Parts by wt. | Adhesion of coating To— | Cure, °F./time | Failure |
|---|---|---|---|---|
| Epon 828 (Epoxy) | 100 | Chrome-Plated GC.[1] | 200° F./10 min. | Coating.[2] |
| Tetraethylene pentamine | 10 | | | |
| Perchloroethylene | 100 | | | |
| Epon 828 (Epoxy) | 100 | ---do[1]--- | 200° F./10 min. | (3). |
| Graft Copolymer A | 25 | | | |
| Tetraethylene pentamine | 9 | | | |
| Perchloroethylene | 100 | | | |

[1] Coating of chrome-plated graft copolymer specimens were tested by spraying the specimens with the recipe indicated, curing at the 200° F./10 minute conditions, and allowing to stand for 24 hours at ambient conditions. Adhesive qualities were tested by drawing ten scribe marks to the inch vertically and horizontally. A strip of Scotch brand tape was firmly pressed down on the scribed, coated surface and the tape was pulled off.
[2] In this instance, the coating failed when it pulled away from the plated surface of the graft copolymer with Scotch brand tape.
[3] The coating held firmly to the plated graft copolymer due to the strength of the coating bond.

TABLE 3

| Recipe | Parts by Wt. | Shear, p.s.i.[1] | Cure °F./time |
|---|---|---|---|
| Epon 828 (Epoxy) | 100 | 3,850 | 350°/1 hr. |
| Dicyandiamide | 4 | | |
| Benzyldimethylamine | 0.2 | | |
| Methyl Cellosolve | 36 | | |
| Methyl ethyl ketone | 100 | | |
| Epon 828 (Epoxy) | 100 | 2,200 | 350°/1 hr. |
| Graft Copolymer A | 400 | | |
| Dicyandiamide | 4 | | |
| Benzyldimethylamine | 0.2 | | |
| Methyl Cellosolve (applied as film) | 36 | | |
| Epon 828 (Epoxy) | 100 | 4,350 | 350°/1 hr. |
| Graft Copolymer A | 25 | | |
| Dicyandiamide | 4 | | |
| Benzyldimethylamine | 0.2 | | |
| Methyl ethyl ketone | 125 | | |
| Epon 828 (Epoxy) | 100 | 3,120 | 350°/1 hr. |
| Graft Copolymer B | 400 | | |
| Dicyandiamide | 4 | | |
| Benzyldimethylamine | 0.2 | | |
| Methyl Cellosolve (applied as film) | 36 | | |
| Epon 828 (Epoxy) | 100 | 4,095 | 350°/1 hr. |
| Graft Copolymer B | 25 | | |
| Dicyandiamide | 4 | | |
| Benzyldimethylamine | 0.2 | | |
| Methyl ethyl ketone | 125 | | |
| Unox 221 (Epoxy) | 100 | 750 | [2] 250°/1 hr. |
| Boron trifluoride-monoethyl amine complex | 4 | | |
| Methyl ethyl ketone | 100 | | |
| Unox 221 (Epoxy) | 100 | 1,850 | [2] 250°/1 hr. |
| Graft Copolymer A | 400 | | |
| Boron trifluoride-monoethylamine complex (applied as film) | 4 | | |
| Unox 221 (Epoxy) | 100 | 3,790 | [2] 250°/1 hr. |
| Graft Copolymer A | 25 | | |
| Boron Trifluoride-monoethylamine complex | 4 | | |
| Methyl ethyl ketone | 125 | | |
| Unox 221 (Epoxy) | 100 | 1,520 | [2] 250°/1 hr. |
| Graft Copolymer B | 400 | | |
| Boron Trifluoride-monoethylamine complex (applied as film) | 4 | | |
| Unox 221 (Epoxy) | 100 | 1,600 | [2] 250°/1 hr. |
| Graft Copolymer B | 25 | | |
| Boron Trifluoride-monoethylamine complex | 4 | | |
| Methyl ethyl ketone | 125 | | |
| Epon 828 (Epoxy) | 80 | 500 | [2] 250°/1 hr. |
| Graft Copolymer C | 20 | | |
| Tetraethylpentamine | 13 | | |
| Methyl ethyl ketone | 20 | | |

[1] Measured on Steel surface.
[2] Followed by 300°/2 hrs.

The tables illustrate the bond strengths of various compositions of this invention by setting forth the shear strengths of the bond between various exemplary materials. It will be understood by those skilled in the art of adhesives and coatings that the bond strengths on a given surface may be indicated for coatings as well as for adhesives by applying the composition to a surface and measuring the shear strength. Attention is directed to Table 3 which shows that the compositions of this invention provide stronger coating bonds on chrome-plated graft copolymer than those obtained from conventional epoxy coatings.

The tables also indicate the strength of a graft copolymer per se adhesive is less than 100 p.s.i. if tested by the procedure set forth above.

It will also be noted that the compositions of this invention, in addition to being good bonding materials for steel, ceramics, wood, fibers, leathers, etc., as well as bonding flocks and the like to chrome-plated materials and especially chrome-plated ABS plastics, are also useful as films and fibers.

The compositions of this invention will find application in a variety of uses such as adhering materials to card table tops, pool table covers, casket interiors, shoe heels, headliners for automobiles and the like. The compositions will also find application as films, encapsulating resins, and fibers as well as coatings in the form of paints, lacquers, varnishes and the like.

It should be understood that while this invention has been described in connection with certain specific embodiments thereof, that this is by way of illustration and not by way of limitation and the scope of the invention is defined solely by the appended claims which should be construed as broadly as is consistent with the prior art.

What is claimed is:

1. A resin composition comprising from about 4% by weight to about 96% by weight of (1) an ABS graft polymer prepared by polymerizing from about 40–90% by weight of a mixture of monomers selected from the group consisting of styrene, α-methylstyrene, vinyltoluene, vinylxylene, ethylvinylbenzene, isopropylstyrene, chlorostyrene, dichlorostyrene, ethylchlorostyrene, acrylonitrile, methacrylonitrile, ethacrylonitrile, chloroacrylonitrile, methyl methacrylate, ethyl methacrylate, propyl methylacrylate and mixtures thereof in the presence of from about 60% to about 10% by weight of a polymeric material selected from the group consisting of conjugated diene polymers and conjugated diene copolymers blended with (2) from about 96% by weight to about 4% by weight epoxy resin.

2. The composition of claim 1 wherein the composition contains from about one percent to about 90 percent by weight of at least one curing agent for epoxy resins selected from the group consisting of Lewis acid curing agents, carboxylated curing agents, and polyamide, polyamine, urea, phenolic and substituted phenolic curing agents.

3. The composition of claim 1 wherein the graft polymer is prepared by polymerizing acrylonitrile and styrene in the presence of polybutadiene.

4. The composition of claim 1 wherein the epoxy resin has a molecular weight between about 300 and 4000.

5. The composition of claim 2 wherein the curing agent is added in an amount of from about one percent to about 90 percent by weight of the total composition.

6. An adhesive and coating composition comprising (1) from about 4% by weight to about 96% by weight of an ABS graft polymer prepared by polymerizing a mixture of monomers selected from the group consisting of styrene, α-methylstyrene, vinyltoluene, vinylxylene, ethylvinylbenzene, isopropylstyrene, chlorostyrene, dichlorostyrene, ethylchlorostyrene, acrylonitrile, methacrylonitrile, ethacrylonitrile, chloroacrylonitrile, methyl methacrylate, ethyl methacrylate, propyl methylacrylate and mixtures thereof in the presence of a polymeric material selected from the group consisting of conjugated diene polymers and conjugated diene copolymers blended with (2) from about 96% by weight to about 4% by weight epoxy resin.

7. The composition of claim 1 wherein a monomer selected from the group consisting of acrylonitrile, methacrylonitrile, ethacrylonitrile, chloroacrylonitrile, methyl methacrylate, ethyl methacrylate and propyl methacrylate comprises from 5–45% by weight of the total graft polymer composition and a monomer selected from the group consisting of styrene, α-methylstyrene, vinyltoluene, vinylxylene, ethylvinylbenzene, isopropylstyrene, chlorostyrene, dichlorostyrene and ethylchlorostyrene comprises from about 30% to about 80% of the total graft polymer composition and the polymeric material of the graft polymer composition comprises from about 10% to about 60% of the total graft polymer composition.

References Cited

UNITED STATES PATENTS

| | | | |
|---|---|---|---|
| 3,322,852 | 5/1967 | Trementozzi | 260—837 |
| 3,322,853 | 5/1967 | Trementozzi | 260—837 |

SAMUEL H. BLECH, Primary Examiner

PAUL LIEBERMAN, Assistant Examiner

U.S. Cl. X.R.

117—161; 161—184, 186; 260—2, 23.7, 32.8, 33.6, 33.8, 37, 41.5, 47, 78.4, 837, 879, 880